United States Patent [19]

Nojima et al.

[11] 3,846,766

[45] Nov. 5, 1974

[54] ASSOCIATIVE MEMORIES INCLUDING MOS TRANSISTORS

[75] Inventors: Isao Nojima; Keikichi Tamaru; Tai Sato, all of Yokohama, Japan

[73] Assignee: Tokyo Shibaura Electric Co., Ltd., Kawasaki-shi, Japan

[22] Filed: Aug. 30, 1973

[21] Appl. No.: 393,037

Related U.S. Application Data

[63] Continuation of Ser. No. 237,455, March 23, 1972.

[30] Foreign Application Priority Data

Mar. 25, 1971 Japan .............................. 46-16834

[52] U.S. Cl. ......... 340/173 AM, 307/238, 307/279, 340/173 R

[51] Int. Cl. ......................................... H01r 13/50

[58] Field of Search ................ 240/173 R, 173 AM; 307/238, 279

[56] References Cited

UNITED STATES PATENTS 3,750,115 7/1973 Mundy ....................... 340/173 AM

*Primary Examiner*—Terrell W. Fears

*Attorney, Agent, or Firm*—Kemon, Palmer & Estabrook

[57] ABSTRACT

An associative memory comprises at least one memory cell constituted by two MIOS transistors having hysteresis gate threshold voltage characteristics. The MIOS transistors are combined such that for a gate voltage of a selected value, one MIOS transistor is in ON state whereas the other OFF state. These states correspond to a binary "1." On the other hand, the states where said one MIOS transistor is in OFF state and the other ON state correspond to binary "0."

5 Claims, 10 Drawing Figures

ASSOCIATIVE MEMORIES INCLUDING MOS TRANSISTORS

This is a continuation of application Ser. No. 237,455, filed Mar. 23, 1972.

BACKGROUND OF THE INVENTION

This invention relates to an associative memory including MOS (metal oxide semiconductor) transistors, and more particularly to a memory device including MIOS transistors whose gate threshold voltages have hysteresis characteristics.

In an electronic computor, for example, it is necessary to determine whether a desired information is contained or not in a plurality of informations stored in a memory section of the computor by comparing the desired information with an interrogation information for reading out the information corresponding to the interrogation information thereby processing the read out information. An associative memory is important for attaining this object. An associative memory including flip-flop circuits containing MOS transistors has been proposed. However, this known type of the associative memory has the following defects.

First, since it is necessary to use from six to eight MOS transistors to constitute each one bit associative memory cell it is necessary to use a large number of MOS transistors in order to fabricate a large capacity associative memory.

Second, since flip-flop circuits are used, the contents of the memory are volatile or destroyed whenever the operating voltage is removed.

Third, since the digit lines and the interrogation lines of the associative memory are provided independently it is necessary to use a plurality of jumper lines for connecting them to other circuits or conductors whereby the memory device as a whole becomes greatly complicated.

Fourth, it is impossible to simultaneously read out a plurality of words because the memory contents of other words connected to the read out bit lines are destroyed.

SUMMARY OF THE INVENTION

Accordingly, it is an object of this invention to provide an improved associative memory capable of eliminating any one and all of said defects.

Another object of this invention is to provide an improved associative memory characterized in that each one bit memory cell is constituted by two MIOS transistors, that the memory is non-destructive, that the same line can be used as a digit line as well as an interrogation line, and that the contents of the memory are not destroyed even when a plurality of words are read out simultaneously.

The associative memory of the invention comprises at least one bit memory cell constituted by a pair of MIOS transistors each having first and second electrodes and a gate electrode, the threshold value of the gate voltage having a hysteresis characteristic corresponding to the voltage impressed upon the gate electrode. Said each MIOS transistor takes an upper or lower value of threshold voltage according to said impressed gate voltage. The pair of MIOS transistors are combined such that for a selected gate voltage of a value intermediate the upper and lower values, one MIOS transistor is in ON state, whereas the other OFF state. The associative memory further comprises means for applying a control voltage upon respective gate electrodes of the pair of MIOS transistors, interrogation means including an interrogation line adapted to apply an interrogation voltage upon the respective first electrodes of the pair of MIOS transistors, and associative read out means including output lines commonly connected to the respective second electrodes of the pair of MIOS transistors for producing outputs corresponding to the interrogation voltage.

The gate electrodes of two MIOS transistors constituting the one bit memory cell may be commonly connected to a single word line. Alternatively, different work lines may be connected to different gate electrodes.

The first electrode of each MIOS transistor is connected to an interrogation line which may be used as a sense line or a digit line. The second electrodes of the pair of MIOS transistors are commonly connected to a coincidence or read out line (or matching line) on which appears a signal indicating whether an interrogation information supplied from the interrogation line coincides or not with the information stored in the one bit memory cell.

As is well known in the art, a MOS transistor having a threshold gate voltage hysteresis characteristic can be fabricated by constructing the gate insulator layer as multilayer films. The MOS transistor having such a construction is generally termed a MIOS transistor (metal insulated oxide silicon transistor) and the MIOS transistor whose insulator layer is constructed as two layers consisting of a silicon nitride ($Si_3N_4$) layer and a silicon oxide ($SiO_2$) layer is termed a MNOS (metal nitride oxide silicon) transistor. When a gate voltage of a relatively large absolute value is applied to the MIOS transistor of these types and then the gate voltage is reduced to zero these MIOS transistors will have a threshold voltage of upper or lower value dependent upon the polarity of the impressed voltage. A pair of MIOS transistors of such characteristics are combined into a one bit associative memory cell (there are three combinations, one including two MIOS transistors of the same conductivity type and having different type hysteresis characteristics, the second including two MIOS transistors of the different conductivity type) in such a manner that for a gate voltage of a value intermediate said upper and lower values of threshold voltage one of the MIOS transistors is in ON state and the other OFF state. The informations can be stored in the memory by making the states wherein one MIOS transistor is ON and the other is OFF to correspond to a binary 1 and the states wherein said one transistor is OFF and the other is ON to a binary 0.

DESCRIPTION OF THE PREFERRED EMBODIMENTS

Figure 1:
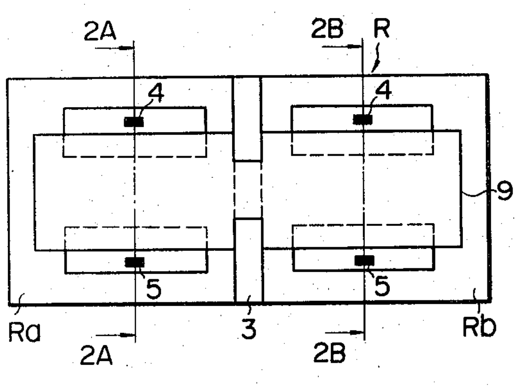
FIG. 1 shows a one bit memory cell comprising a combination of p-channel MIOS transistors and n-channel MOS transistors.
Figure 2A:
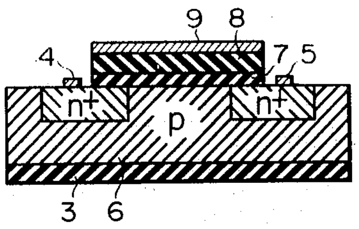
FIG. 2A shows a sectional view of the-one bit memory cell shown in FIG. 1 taken along a line 2A—2A.
Figure 2B:
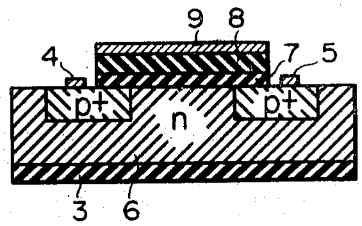
FIG. 2B shows a sectional view of the one bit memory cell shown in FIG. 1 taken along a line 2B—2B.
Figure 3:
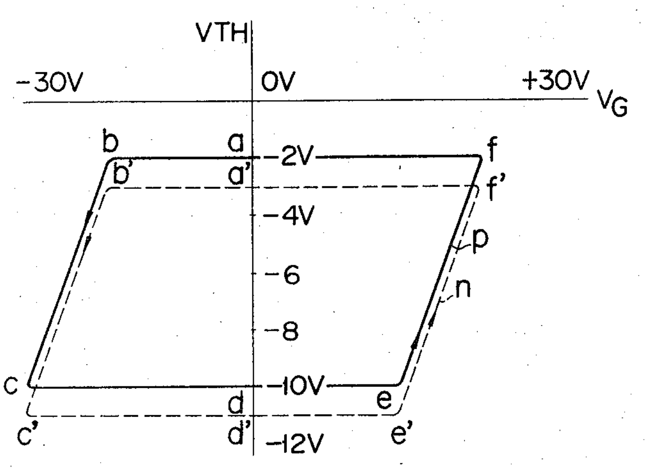
FIG. 3 is a plot showing the gate voltage hysteresis characteristics of the MIOS transistors shown in FIGS. 2A and 2B.

Referring now to the accompanying drawings, the one bit associative memory cell R comprises an n-channel type first MIOS transistor Ra and a p-channel type second MOS transistor Rb which are spaced apart and are secured to an insulator 3. Respective $n^+$ regions of the n-channel MIOS transistor R*a* are provided with a first electrode 4 and a second electrode 5, respectively, and a $SiO_2$ layer 7 having a thickness of about 20 angstroms overlies respective $n^+$ regions and a p region 6. A $Si_3N_4$ layer 8 having a thickness of about 500 angstroms is applied on the layer 7, as shown in FIG. 2A. In the same manner, respective $p^+$ regions of the p-channel MIOS transistor R*b* are provided with a first electrode 4 and a second electrode 5, respectively, and a $SiO_2$ layer 7 having a thickness of about 20 angstroms overlies respective $p^+$ regions and n region 6'. A $Si_3N_4$ layer 8 is applied on the layer 7 as shown in FIG. 2B. As shown in FIG. 1, a common gate electrode 9 is applied on layers 8 of both transistors Ra and Rb. Layers 7 and 8 may be made of $Al_2O_3$ or $TiO_2$, for example. Either one of the first and second electrodes 4 and 5 is used as the source electrode whereas the other as the drain electrode. It is well known in the art that the threshold voltage Vth of these MIOS transistors takes the form of a hysteresis curve as shown in FIG. 3 in which the abscissa represents the gate voltage $V_G$ and the ordinate the threshold voltage Vth. In the case of the p-channel MIOS transistor R*b*, when the gate voltage $V_G$ is varied in the order of 0V–(–30V)–0V, the threshold voltage Vth varies as shown by a curve *a-b-c-d*. In other words, the threshold voltage varies from –2V to –10V. On the other hand, when the gate voltage $V_G$ is varied in the order of 0V–(+30V)–0V, then the threshold voltage Vth varies along a curve *d-e-f-a* whereby the threshold voltage varies from –10V to –2V. Accordingly, once a voltage of +30V is applied to the gate electrode of transistor Rb, this transistor will become OFF at a gate voltage of $V_G \geqq -2V$ and become ON at a gate voltage of $V_G < -2V$. On the other hand, once a voltage of –30V is applied to the gate electrode of transistor R*b*, this transistor will become OFF at a voltage of $V_G \geqq -10V$ and become ON at a gate voltage of $V_G < -10V$.

In the case of the n-channel MIOS transistor R*a*, when the gate voltage $V_G$ is varied in the order of 0V–(–30V)–0V, as shown by a dotted line curve, t threshold voltage Vth will vary along a curve *a'-b'-c'-d'* whereby the threshold voltage varies from –3V, to –11V. On the other hand, when the gate voltage is varied in the order of 0V–(+30V)–0V, the threshold voltage Vth will vary along a curve *d'-e'-f'-a'* whereby the threshold voltage varies from –11V to –3V. Accordingly, once a gate voltage of +30 V is impressed upon transistor R*a* this transistor R*a* will become ON at a gate voltage of $V_G \geqq -3V$ and become OFF at a gate voltage of $V_G < -3V$. Similarly, once a gate voltage of –30V is impressed upon the gate electrode of transistor R*a*, this transistor R*a* will become ON at a gate voltage of $V_G \geqq -11V$ and become OFF at a gate voltage of $V_G < -11V$.

Following table shows the ON-OFF conditions of transistors R*a* and R*b* when gate voltages of ±30V are firstly impressed and then gate voltages of 0V and –5V are applied. The voltage –5V may be any value between the upper and lower limits of the threshold voltage so that this voltage is not limited to –5V.

Table

| (firstly applied) $V_G$ (gate voltage applied next time) | $V_G$ = +30V | | $V_G$ = –30V (firstly applied) | |
|---|---|---|---|---|
| | P-channel R*b* | n-channel R*a* | p-channel R*b* | n-channel R*a* |
| 0V | OFF | ON | OFF | ON |
| –5V | ON | OFF | OFF | ON |

As can be noted from this table, transistors R*a* and R*b* assume opposite ON - OFF states for the same gate voltage $V_G = 5V$. For this reason, it is possible to make the ON state of the p-channel transistor and the OFF state of the n-channel transistor to correspond to the writing of a binary 1 and to make the OFF state of the p-channel transistor and the ON state of the n-channel transistor to correspond to the writing of a binary 0. This means that it is necessary to apply a voltage of +30V or –30V upon the gate electrode for writing.

Figure 4:
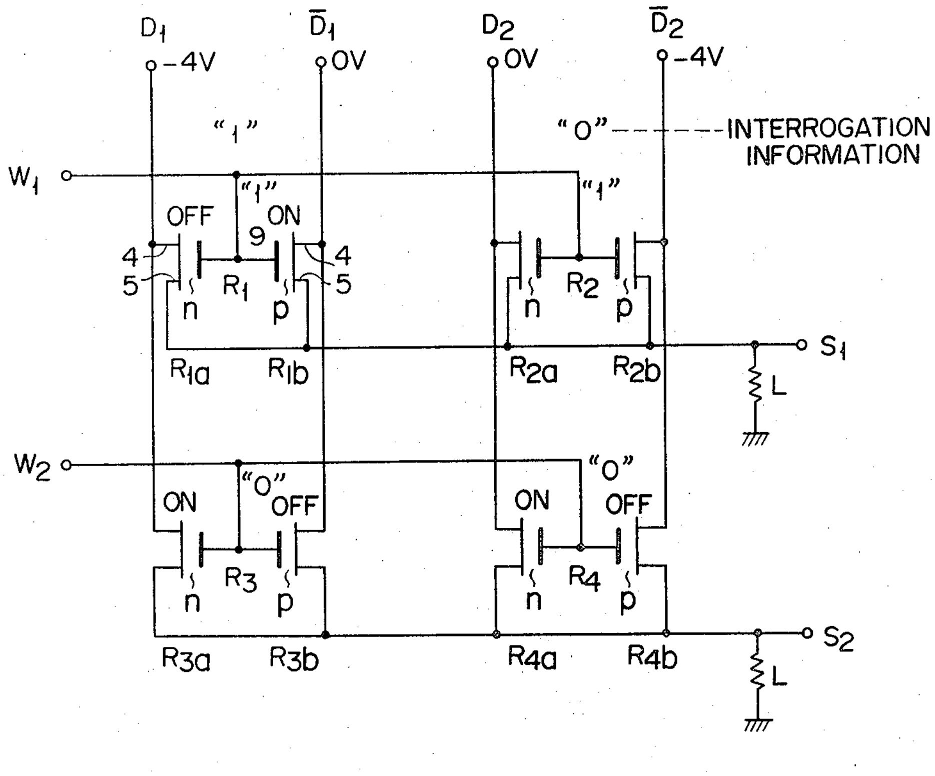
FIG. 4 is a circuit diagram of an associative memory comprising four one bit memory cells shown in FIG. 1.

FIG. 4 shows the connection diagram of one example of the associative memory comprising a plurality of one bit associative memory cells described above. In this figure, cells $R_1$ and $R_2$ cooperate to constitute one word of two bits whereas cells $R_3$ and $R_4$ cooperate to constitute another two bit word. The gate electrodes 9 of the transistors of respective cells $R_1$ and $R_2$ are commonly connected to a word line $W_1$ whereas the gate electrodes of the transistors of cells $R_3$ and $R_4$ are commonly connected to the other word line $W_2$. A digit line $D_1$ is connected to the first electrodes 4 of the n-channel transistors of cells $R_1$ and $R_3$. A digit line $\overline{D}_1$ is connected to the first electrodes 4 of the p-channel transistors of cells $R_1$ and $R_3$. A digit line $\overline{D}_2$ is connected to the first electrodes 4 of the n-channel transistors of cells $R_2$ and $R_4$ whereas a digit line $D_2$ is connected to the first electrodes 4 of the p-channel transistors of cells $R_2$ and $R_4$. The second electrodes 5 of the transistors of cells $R_1$ and $R_2$ are commonly connected to one associative read out line (matching line) $S_1$, whereas the second electrodes 5 of respective transistors of cells $R_3$ and $R_4$ are commonly connected to the other associative read out line $S_2$. Read out lines $S_1$ and $S_2$ are grounded through load resistors L, respectively. Each one of the digit lines $D_1$, $\overline{D}_1$, $D_2$ and $\overline{D}_2$ also acts as an interrogation line.

Writing of an information is performed in the following manner. First a voltage of −30V is applied to each of the word lines $W_1$ and $W_2$ for the purpose of clearing the memories of respective cells. At this time, a 0 is stored in each cell as shown in the table described above (that is the state wherein the p-channel transistor is OFF and the n-channel transistor is ON at $V_g$=−5V). To write a 1 in cells $R_1$ and $R_2$, a voltage of +30V is impressed upon the word line $W_1$. Then, as shown in the table, the n-channel transistor will become OFF and the p-channel transistor at $V_G$=−5V, thus assuming a state of 1.

To interrogate whether a 1 is stored or not in the cell $R_1$, −4V is applied to interrogation line $D_1$, 0V to interrogation line $\overline{D}_1$, −5V to word line $W_1$ and 0V to word line $W_2$. If the cell $R_1$ has been storing a 1, no output will appear on read out line $S_1$ notwithstanding the fact that the p-channel transistor is now being conductive because 0V is applied to the interrogation line $\overline{D}_1$. Furthermore, since the n-channel transistor is OFF, no output will appear on read out line $S_1$ notwithstanding the fact that −4V is applied to interrogation line $D_1$. In other words, no output appears on the read out line $S_1$ when the interrogation information (in this case a 1) and the memory contents in this case a 1 coincide with each other.

To interrogate whether a 0 is stored or not in cell $R_2$, 0V is applied to interrogation line $D_2$, −4V to interrogation line $\overline{D}_2$, −4V to word line $W_1$ and 0V to word line $W_2$. However, since the cell $R_2$ has been storing a 1, the p-channel transistor will be ON, whereas the n-channel transistor OFF. Accordingly, a current flows from interrogation line $\overline{D}_2$ to load resistor L via the p-channel transistor thereby producing an output on the read out line $S_1$. In this manner, an output appears on the read out line $S_1$ when the interrogation information (in this case a 0) and the memory content (in this case a 1) of cell $R_2$ do not coincide with each other. While cell $R_3$ is storing a 0, in order to interrogate whether it stores or not a 1, a voltage of −4V is applied to interrogation line $D_1$, 0V to interrogation line $\overline{D}_1$, −5V to word line $W_2$ and 0V to word line $W_1$. In this case, since a current flows from interrogation line $D_1$ through load resistor L connected to read out line $S_2$ via the n-channel transistor, an output will appear on the read out line $S_2$. In this manner, an output appears on read out line $S_2$ when the interrogation information and the memory content do not coincide with each other.

While cell $R_4$ is storing a 0, when an interrogation is made whether the cell $R_4$ is storing ON not a 0 by applying 0V to interrogation line $D_2$, −4V to interrogation line $\overline{D}_2$, −5V to word line $W_2$ and 0V to word line $W_1$, no output will appear on read out line $S_2$ because the p-channel transistor is OFF.

As above described, with this arrangement it is possible to check the coincidence and non-coincidence between the memory content of the cell and the interrogation information by the presence or absence of the output on the associative read out line. Furthermore, it can be clearly noted from the above description that the detection can be made concurrently for different word lines.

Subsequent to the associative read out operation described above, an ordinary read out operation is performed. In this case, load resistors (not shown) are connected also to the interrogation lines (digit lines $\overline{D}_1$ and $D_2$) connected to the first electrodes of the p-channel transistors, a voltage of −4V, for example, is applied to these interrogation lines and −5V is applied to a word line, for example $W_1$, associated with the word to be read out. As above described, since cell $R_1$ has been storing a 1 and since the p-channel transistor is ON, the line $\overline{D}_1$ will assume 0V by being grounded through the load resistor L. Then, when the memory content of cell $R_3$ is read out by applying −5V to word line $W_2$ alone, interrogation line $\overline{D}_1$ will assume −4V since the p-channel transistor of cell $R_3$ is in its OFF state. Thus, it is possible to read out a 1 when interrogation line $\overline{D}_1$ assumes 0V, whereas a 0 when the interrogation line $\overline{D}_1$ assumes −4V. Similarly, with regard to cell $R_2$, interrogation line $\overline{D}_2$ will assume 0V whereas with regard to cell $R_4$, interrogation line $\overline{D}_2$ will assume −4V.

Where a plurality of words are simultaneously selected (when −5V is applied to both word lines $W_1$ and $W_2$), similar output will appear on digit line $\overline{D}_1$ where all bits (in this case $R_1$ and $R_3$) corresponding to respective words are storing 1 or 0. Cells $R_2$ and $R_4$ and digit lines $D_2$ and $\overline{D}_2$ have the same relationship. Where the bits corresponding to respective words are storing a 1 and 0 both digit lines $D_1$ and $\overline{D}_1$ will assume 0V. This is extremely advantageous in the associative read out. Of course, it is possible to simultaneously read out two bits for each word.

Figure 5:
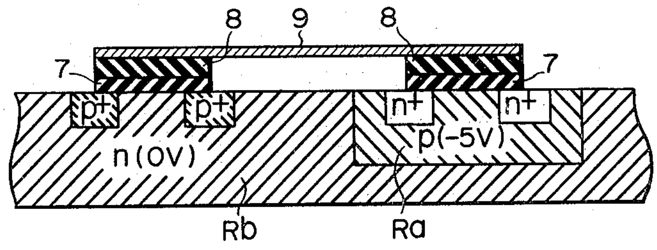
FIG. 5 is a sectional view showing a modified embodiment comprising a combination of a p-channel MIOS transistor and an n-channel MOS transistor.

Although in the construction shown in FIG. 1, MOS transistors R*a* and R*b* are mounted space apart on the same insulator 3 it is possible to form a p-channel MIOS transistor R*b* directly on an n-conductivity type semiconductor substrate and to form an n-channel MIOS transistor R*a* in a P-type semiconductor region which is formed in the n-conductivity type semiconductor substrate by any well known technique, as shown in FIG. 5. In this modification, −5V is applied to the P-type region, whereas 0V is applied to the N-type region so as to provide an insulation utilizing the p-n junction.

While in the construction shown in FIG. 1, one bit memory cell is constituted by a p-channel MIOS transistor and an n-channel MIOS transistor it should be understood that the one bit memory cell can also be formed by two MIOS transistors of the same conductivity type. More particularly, in the MIOS type transistor, it is possible to form two types of MIOS transistors having gate threshold voltage hysteresis characteristics which rotate in the opposite direction as shown by the arrows in FIG. 6 by controlling the construction of the gate insulations. In this figure, curve IJ represents the hysteresis characteristic of an injection type MIOS transistor, whereas curve ID that of an ion drift type MIOS transistor. In the case of a p-channel, MIOS transistor of the IJ type, where the gate voltage $V_G$ is varied in an order 0V−(+30V)−0V, the threshold voltage Vth will vary along a curve *k-l-m-g*, whereby the threshold voltage shifts from −10V to −2V. On the other hand, when the gate voltage is varied in an order 0 V−(−30V)−0V, the threshold voltage will vary along a curve *g-h-i-k* thereby shifting the threshold voltage from −2V to −10V.

Figure 6:
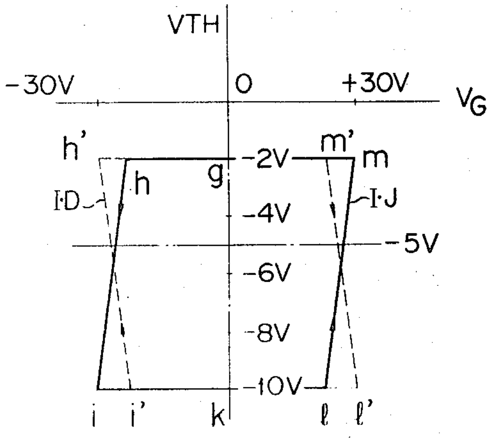
FIG. 6 is a plot showing the gate voltage hysteresis characteristics of two MIOS transistors of the same conductivity type but having different type hysteresis characteristics.

In the p-channel MIOS transistor of the ID type, when the gate voltage is varied in an order 0V—(+30-V)—0V, the threshold voltage will vary along a curve *g-m'-l-k* thereby shifting the threshold voltage from −2V to −10V. On the other hand, when the gate voltage is varied in an order 0V—(−30V)—0V, the threshold voltage will vary along a curve *k-i'-k'-g* thereby shifting the threshold voltage from −10V to −2V. As shown in FIG. 6, these two hysteresis characteristics rotate in the opposite directions and vary substantially symmetrically with respect to the ordinate which represents the value of the threshold voltage Vth. In the case of a p-channel MIOS transistor, impression of a gate voltage of −30V causes the IJ type transistor to be ON condition and the ID type transistor to be OFF condition for a gate voltage of −5V between the threshold voltage of −2V and the threshold voltage of −10V, whereas impression of a gate voltage of +30V the IJ type transistor to be OFF state and the ID type transistor to be ON state for the same gate voltage of −5V.

In the case of an n-channel MOS transistor, when a gate voltage of −30V is applied, the IJ type transistor will be in OFF state whereas the ID type transistor in ON state. On the other hand, application of a gate voltage of +30V causes the IJ type transistor to be ON condition whereas the ID type transistor to be OFF condition. Accordingly, where a p-channel MIOS transistor of the IJ type and a p-channel MOS transistor of the ID type are combined to constitute a one bit memory cell it is also possible to form an associative memory by making the ON state of the IJ type transistor and the OFF state of the ID type transistor to correspond to a binary 1 and by making the OFF state of the IJ type transistor and the ON state of the ID type transistor to a binary 0.

Figure 7:
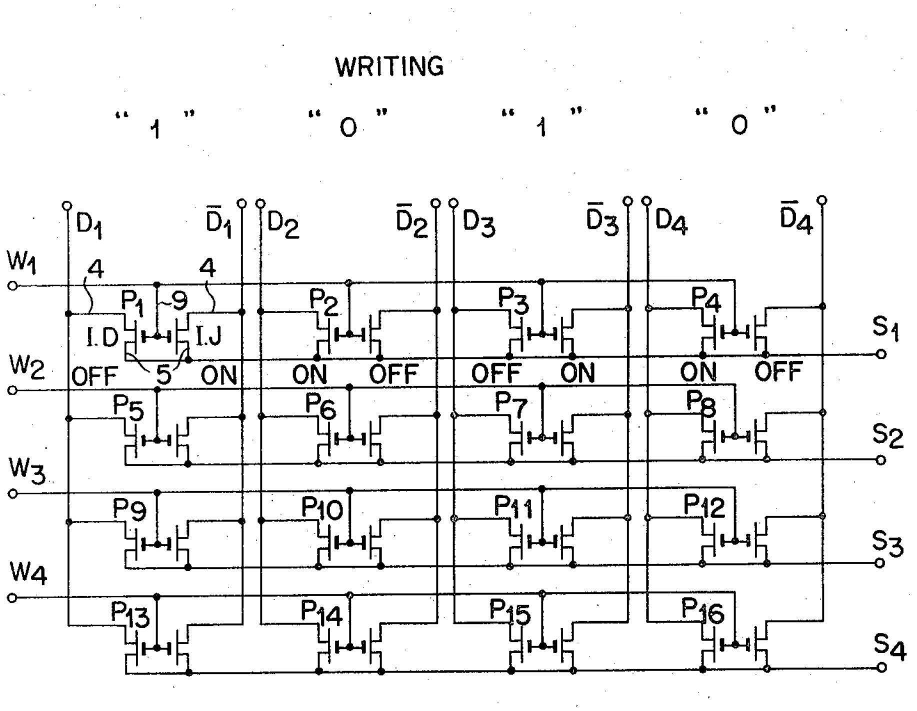
FIG. 7 shows a circuit diagram of an associative memory, particularly the writing means thereof, wherein each one bit memory cell is constituted by two MIOS transistors of the same conductivity type but having different type hysteresis characteristics.

FIG. 7 shows a connection diagram of an associative memory comprising 16 memory cells each including a p-channel MIOS transistor (IJ) of the IJ type and a p-channel MIOS transistor (ID) of the ID type. The gate electrodes 9 of transistors of memory cells $P_1$ through $P_4$ are commonly connected to a word line $W_1$, the gate electrodes of transistors of cells $P_5$ through $P_8$ to a word line $W_2$, the gate electrodes of transistors of cells $P_9$ through $P_{12}$ to a word line $W_3$ and the gate electrodes of transistors of cells $P_{13}$ through $P_{16}$ to a word line $W_4$. The first electrodes 4 of ID type transistors of cells $P_1$, $P_5$, $P_9$ and $P_{13}$, are connected to a digit line $D_1$ while the first electrodes 4 of IJ type transistors of the same cells to a digit line $\overline{D}_1$. The first electrodes of ID type transistors of cells $P_2$, $P_6$, $P_{10}$ and $P_{14}$ are connected to a digit line $D_3$ while the first electrodes 4 of IJ type transistors of the same cells to a digit line $\overline{D}_2$. The first electrodes of ID type transistors of cells $P_3$, $P_7$, $P_{11}$ and $P_{15}$ are connected to a digit line $D_3$ and the first electrodes of IJ type transistors of the same cells to a digit line $\overline{D}_3$. The first electrodes of ID type transistors of cells $P_4$, $P_8$, $P_{12}$ and $P_{16}$ are connected to a digit line $D_4$ whereas the first electrodes of IJ type transistors of the same cells to a digit line $\overline{D}_4$. The second electrodes 5 of the MIOS transistors associated with respective word lines $W_1$ through $W_4$ are connected to associated read out lines $S_1$ through $S_4$, respectively.

To write informations in this memory device, +30V, for example, is impressed upon respective word lines $W_1$ through $W_4$ to write 0 in all cells constituted by cells $P_1$ through $P_{16}$ thereby turning OFF the transistors of the IJ type and ON the transistors of the ID type. Then, to write a 1 in a cell $P_1$, a 0 in a cell $P_2$, a 1 in a cell $P_3$, and a 0 in a cell $P_4$, a potential of −30V is impressed upon the digit lines $D_2$, $\overline{D}_2$, $D_4$ and $\overline{D}_4$ and the word line $W_1$. Then, although the IJ type transistors and the ID type transistors of cells $P_2$ and $P_4$ are maintained in their OFF state and ON state respectively, in other words, the memory content 0 is preserved, the IJ type transistors of cells $P_1$ and $P_3$ are inverted to ON state whereas those of the ID type of the same cells are inverted to OFF state thereby changing to a 1 state. In this manner 1-0-1-0 are written in. In this embodiment, it can be clearly noted that informations are written in various cells corresponding to word lines $W_2$, $W_3$ and $W_4$ according to the same order. In other words, a voltage of +30V is impressed upon all word lines $W_1$ through $W_4$.

Figure 8:
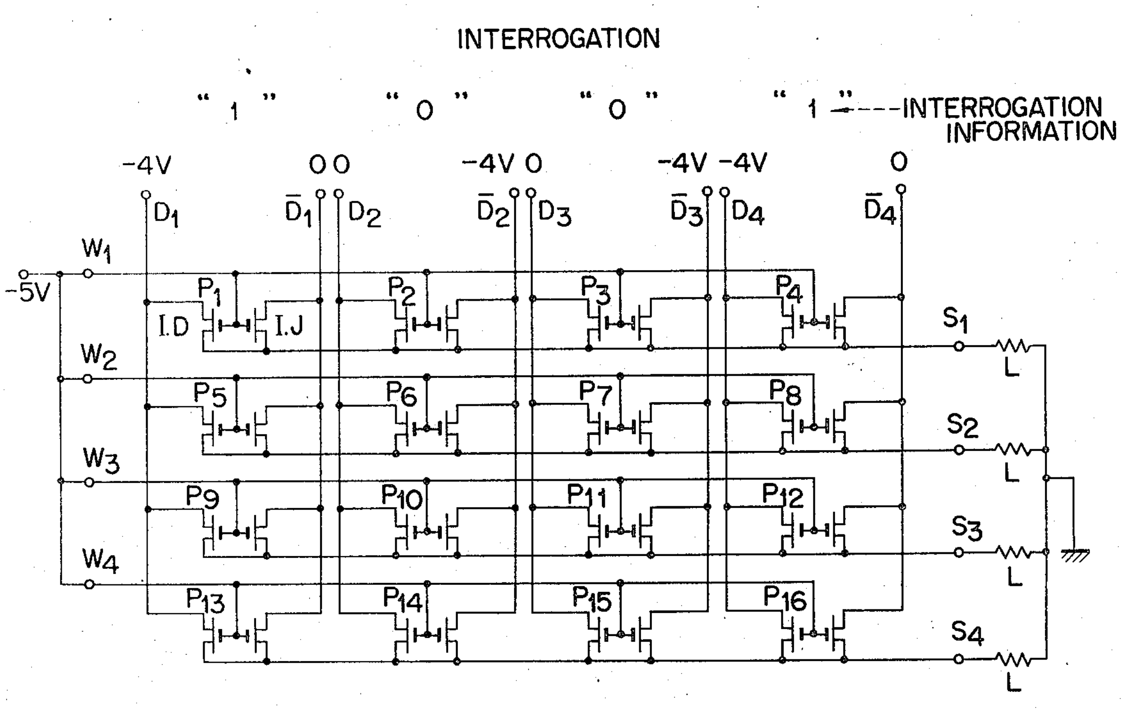
FIG. 8 shows a connection diagram of the interrogation means utilized in the associative memory shown in FIG. 7.

FIG. 8 shows a connection diagram for interrogating informations 1-0-0-1 for the informations 1-0-1-0 written in the memory shown in FIG. 7. More particularly, word lines $W_1$ through $W_4$ are connected in common, whereas all read out lines $S_1$ through $S_4$ are grounded respectively through load resistors L. Generally, to interrogate a 0 a negative potential is impressed upon D lines whereas $\overline{D}$ lines are grounded. To interrogate a 1, D lines are grounded whereas $\overline{D}$ lines are impressed with a negative potential. Accordingly, −5V is impressed upon the word lines, −4V upon digit lines $D_1$, $\overline{D}_2$, $\overline{D}_3$ and $D_4$ and 0V digit lines $\overline{D}_1$, $D_2$, $D_3$ and $\overline{D}_4$. Since informations 1 have been stored in cells $P_1$, $P_5$, $P_9$ and $P_{13}$ respectively, the ID type transistor (shown on the left hand side) are in their OFF state whereas the transistors of the IJ type (shown on the right hand side) are in their ON state for the gate voltages of −5V. Same conditions hold in other cells $P_3$, $P_7$, $P_{11}$ and $P_{15}$. Since cells $P_2$, $P_6$, $P_{10}$ and $P_{14}$ have been stored 0 respectively, the transistors of the ID type are in ON state whereas the transistors of the IJ type are in OFF state for the gate voltage of −5V. Same conditions also hold in cells $P_4$, $P_8$, $P_{12}$ and $P_{16}$, respectively.

Assuming now that −4V and 0 are impressed only on digit lines $D_1$ and $\overline{D}_1$, respectively, since the interrogation information 1 and the memory content 1 coincide with each other, no output appears on the read out line $S_1$. Similarly, when 0 and −4V are applied only upon digit lines $D_2$ and $\overline{D}_2$, respectively, there is no output on the read out line. When 0 V and −4V are impressed upon digit lines $D_3$ and $\overline{D}_3$, respectively, since the interrogation information 0 and the memory content 1 do not coincide with each other, an output appears on the read out line $S_1$. In the same manner, an output appears on a read out conductor when −4V and 0V are impressed upon digit lines $D_4$ and $\overline{D}_4$, respectively. When voltages shown in FIG. 8 are impressed upon respective digit lines, since the interrogation informations 1-0-0-1 and the memory contents 1-0-1-0 do not coincide with each other, an output appears on the read out line $S_1$. With the modification shown in FIG. 8, it is possible to detect the coincidence or non-coincidence of the interrogation informations and the memory contents by comprising them, just in the same manner as in the embodiment shown in FIG. 4.

Figure 9:
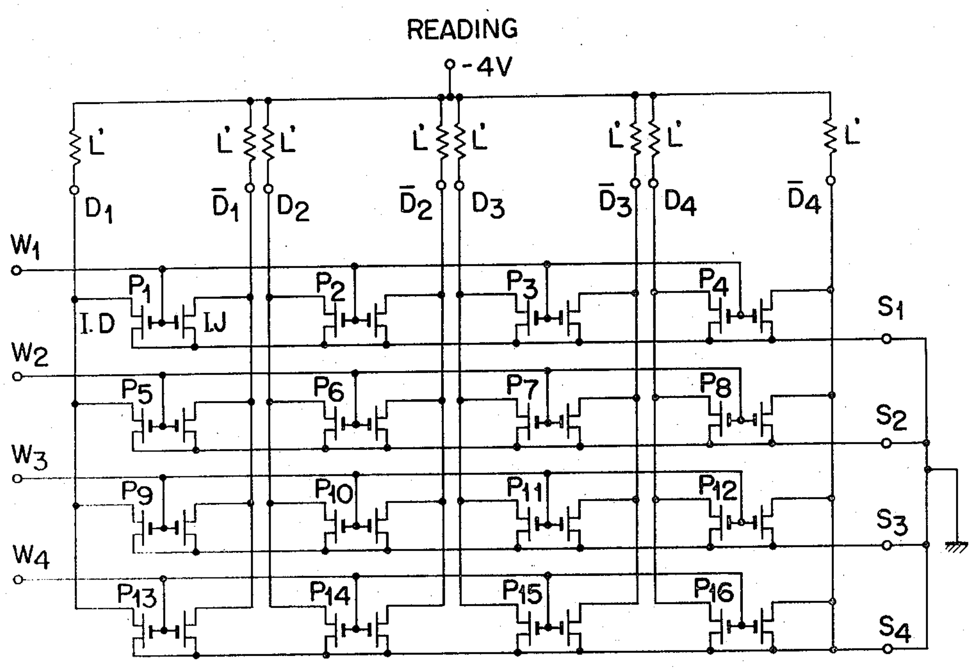
FIG. 9 shows a connection diagram of the read-out means utilized in the associative memory shown in FIG. 7.

FIG. 9 shows a connection diagram of a modified associative memory in which words $W_1$ alone are read out simultaneously from the memory contents stored in the memory shown in FIG. 7. In this case, read out lines $S_1$, $S_2$, $S_3$ and $S_4$ are all grounded and respective digit lines are connected to a common source of −4V, respectively, through load resistors L'.

Again, it is possible to determine the contents of the cells $P_1$ through $P_4$ by detecting the voltages appearing on respective digit lines in the same manner as has been described in connection with FIG. 4.

As above described, the invention provides an improved associative memory characterized in that each one bit associative memory cell is constituted by two MIOS transistors, that the memory is non-destructive, that a single line can be used as a digit line as well as an interrogation line, and that simultaneous read out of a plurality of words does not destroy the memory contents of other words.

It is to be understood that the voltages applied for performing writings, associative read outs and ordinary read outs, and the number of one bit memory cells are not limited to the particular values illustrated in the embodiments.

What we claim is:

1. An associative memory comprising one bit memory cell including:

a pair of MIOS transistors each having a source electrode, a drain electrode, and a gate electrode including double insulating layers and presenting threshold voltage-hysteresis characteristics;

a word line connected commonly to the gate electrodes of said pair of MIOS transistors;

a pair of digit lines connected respectively to the drain electrodes of said pair of MIOS transistors;

a read-out line connected commonly to the source electrodes of said pair of MIOS transisotrs;

writing means for writing a binary signal, including means for selectively impressing voltages of different levels respectively on said pair of digit lines according to the content of said binary signal and for selectively impressing at the same time on said word line a negative or positive polarity voltage of a level high enough to vary the hysteresis characteristics of said pair of MIOS transistors also according to the content of said binary signal; and interrogation means for detecting an output from said read-out line, including means for selectively impressing voltages of different levels respectively on said pair of digit lines according to the content of a binary signal to be interrogated and for impressing at the same time on said word line a voltage of intermediate value between the threshold voltages presented by said hysteresis characteristics varied by said writing means.

2. An associative memory as claimed in claim 1 wherein said pair of MIOS transistors comprise a combination of a p-channel MIOS transistor and an n-channel MIOS transistor and wherein said p-channel and n-channel MIOS transistors present the threshold voltage hysteresis characteristics in the same rotating direction for the voltage impressed on said word line when said writing means is conducted.

3. An associative memory as claimed in claim 1 wherein one of said pair of MIOS transistors is of the injection type whereas the other is of ion drift type having the same conductivity type as that of said injection type.

4. An associative memory as claimed in claim 1 wherein each transistor constituting said pair of MIOS transistors has a gate of metal nitride oxide structure.

5. An associative memory according to claim 1 wherein a plurality of said one bit memory cells are arranged in a matrix, the gate electrodes of said transistors constituting said one bit memory cells in the same row are connected to a common word line, the source electrodes of said transistors are commonly connected to an output line of said associative read-out means, the drain electrodes of one of said two MIOS transistors constituting one bit cells in the same column are commonly connected to one digit line, and the drain electrodes of the other MIOS transistor are commonly connected to another digit line.

* * * * *